Nov. 21, 1933.                E. G. TRAINOR ET AL                1,936,180
                              POTATO STRINGING MACHINE
                                 Filed Jan. 5, 1931
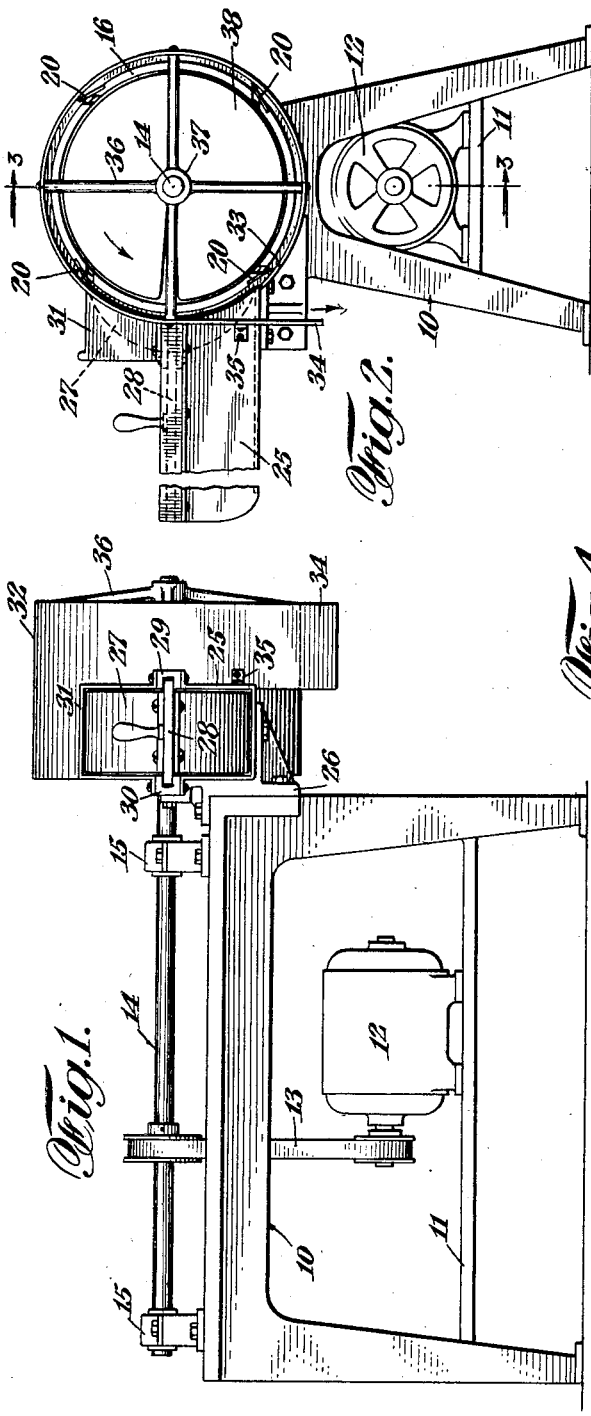
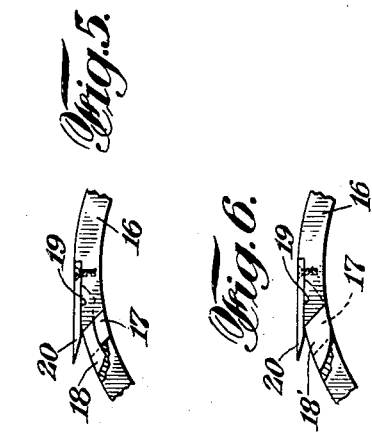
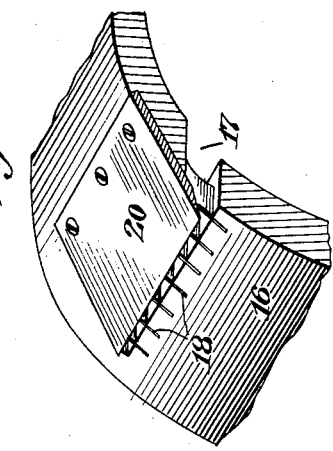
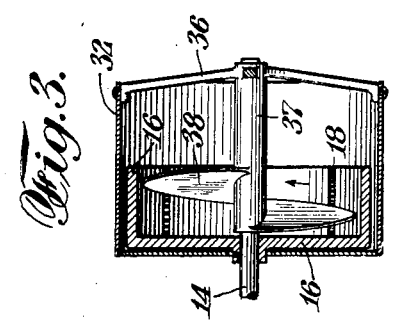
INVENTORS
*Edward G. Trainor*
*Warren L. Schaub*
BY THEIR ATTORNEYS
*Ward, Crosby + Neal*

Patented Nov. 21, 1933 1,936,180

UNITED STATES PATENT OFFICE 1,936,180

POTATO STRINGING MACHINE

Edward G. Trainor, New York, N. Y., and Warren L. Schaub, North Plainfield, N. J.; said Schaub assignor to said Trainor Application January 5, 1931. Serial No. 506,560

5 Claims. (Cl. 146—92)

This invention relates to potato stringing machines. Among the objects of our invention is the provision of a mechanism for cutting potatoes into long strips or strings, or "sticks", for slicing the potato and splitting the slice substantially simultaneously, for performing the stringing or stick cutting operation at a very high rate of speed, and for delivering the stringed potatoes or potato sticks automatically out of the machine.

Another object is the provision of highly efficient mechanism which is inexpensive to manufacture, certain of operation, easy to repair, and free of vibratory motion.

Other objects will appear from the following description taken in connection with the drawing, in which Fig. 1 is a side view of the potato stringing machine constructed in accordance with our invention;

Fig. 2 is an end view looking toward the left in Fig. 1;

Fig. 3 is a vertical section on the line 3—3 of Fig. 2;

Fig. 4 is a section of a cutter carrying drum;

Fig. 5 is a detailed side view of a portion of the drum showing one form of cutter; and Fig. 6 is a similar view showing another form of cutter.

As shown in Fig. 1 the machine may include any suitable form of frame or table 10 which may include a shelf 11 on which may be mounted an electric motor which may be used as the prime mover of the machine. Motion from the motor may be conveyed by a belt 13 to a shaft 14 mounted in suitable bearings 15 supported on the top of the frame or table 10.

As shown in Fig. 1 the shaft 14 extends beyond the right hand end of the frame or table 10 and has connected thereto by any suitable means a cutter carrying drum 16, Figs. 2, 3, 4, 5 and 6. This drum may be provided with one or more, for example four, longitudinally extending slots 17 which are preferably arranged at an angle to the radius of the drum, as shown in Fig. 4. The outer edges of the walls of the slots 17 are provided with saw cuts in which may be mounted short cutting or slice splitting blades 18 suitably supported therein, as illustrated in detail in Fig. 5. These blades may take the form indicated at 18' in Fig. 6 or any suitable form, and the blades may be held in the saw cuts in any desired manner.

As shown in Figs. 5 and 6, the blades 18 are provided with edges 19 against which a slicing blade 20 may be held by screws as shown in Figs. 4, 5 and 6. In this construction the screws function to hold the slicing blade 20 on the cylinder 16, the blade 20 in turn functioning to hold the blades 18 in the saw cuts in the cylinder. By means of this construction the blades 20 and 18 may be readily removed for purposes of repair or replacement by merely removing the screws which attach the blade 20 to the cylinder.

The potatoes to be sliced and stringed are preferably placed in a channel-shaped feeding trough 25, Figs. 1 and 2, which is preferably supported on a bracket 26 secured to the frame or table 10 in any suitable manner. The potatoes may be fed to the cutter blades by means of a crescent shaped feeding block 27 carried by a slide 28 to which it may be secured by any suitable means, as indicated. The slide 28 operates in guide members 29 and 30, of which the guide member 30 may be directly secured to the bracket 26. The guide member 29 may be secured to the trough 25 and also to an upper guiding or hood member 31, the left hand end of which is secured to the guide member 30. The members 25 and 31 may be integral with a cylindrical housing 32 or may be secured thereto by any suitable means.

The left hand portion of the housing shown in Fig. 1 is provided with an opening through which the potatoes may be fed by means of the feeding block 27. The right hand side of the housing 32, as indicated in Figs. 1 and 2, may be open to form a delivery passage for the stringed potatoes or potato sticks produced by this machine and this opening may be formed by cutting a portion of the cylinder as at 33 and bending out a portion of the cylinder to produce a deflector 34 which will control the delivery of the stringed potatoes or potato sticks in the direction indicated by the arrow in Fig. 2 downwardly into any suitable receptacle that may be placed below the delivery opening.

As shown in Figs. 1 and 2 the portion 34 may be secured by means of an angle iron 35 to a side wall of the member 25 and the right hand end of the drum may be provided with spokes 36, as indicated in Figs. 1, 2 and 3, which may carry a hub 37 freely supported on the outer end of the shaft 14.

As shown in Figs. 2 and 3 the hub 37 may be extended to the left within the drum 16 and may be provided with a spiral blade 38 which functions to move the potato strings or sticks to the right, Fig. 3, in the part of the casing 32 on the right of the cutting mechanism.

Upon inspection of Figs. 4, 5 and 6 it is obvious, of course, that the blades 18 and the blade 20 may be corrugated to produce strings or sticks having corrugated sides, if so desired, or these blades may be given any other suitable fancy form. Certain or all of the blades 18 may be removed for the purpose of cutting rectangular sticks or slices.

While in the drawing disclosed the strings or sticks produced are substantially square in cross section it is obvious that the knives may be so mounted and arranged that the strings or sticks or slices produced will be of rectangular, triangular, or of any other cross sectional form.

The machine is set in operation by closing a circuit to the motor and is preferably driven at a high rate of speed. The potatoes are placed in the feeding trough 25 after the feeding block 27 has been moved to the left, Fig. 2, by means of the handle shown in this figure. The handle is then pushed toward the right and the potato moves against the cutter carrying drum as the drum is rotated counter-clockwise, as shown in Fig. 2. The blade 20 slices the potato which is directed by the angular portion of the blade 20 across the blades 18 and through the slots 17 into the interior of the cutter carrying drum. As the drum continues its movement the potato strings or sticks are carried with it and are moved toward the right in Fig. 3 by the stationary spiral blade 38 which is constructed so as to deliver all of the strings or sticks cut during an operation of any one of the assemblies of blades 18 and 20, outside of the cutting cylinder 16 before the same assembly makes the next cutting operation. As the stringed potatoes or potato sticks leave the cutter carrying drum 16 they are thrown out spirally against the right hand end of the housing 32 and continue in the general direction of the movement given to them by the movement of the cutter drum until they reach the delivery passage when they follow the direction of the deflector 34, Figs. 1 and 2, and are delivered out of the machine.

It is thus seen that we have provided a highly efficient machine which is simple in construction and free of all vibratory movements.

It is to be understood that a particular mechanism has been shown and described in detail merely for the purpose of disclosure of the invention, and that the terms of the claims are not to be limited by the disclosure as it is obvious to those skilled in this art, after having become familiar with this invention, that other embodiments or mechanisms within the spirit of this invention could be used. While the embodiment of the invention disclosed has been described as a potato stringing machine, it is obvious that the principles of the invention are applicable to stringing other vegetables, and fruits and various materials.

What is claimed is:

1. The combination of a rotary cutter carrying drum provided with a slot extending longitudinally of the drum and at an angle to the radius of the drum, stringing cutter blades located in diametrical planes and mounted transversely of said slots with their cutting edges extending tangentially of the cylinder, and a slicing cutter blade mounted on said cylinder with its cutting edge in advance of the rear wall of said slot and having the lower face adjacent the cutting edge extending substantially parallel to the rear wall of said slot.

2. The combination of a rotary cutter carrying drum provided with a slot extending longitudinally of the drum, the side walls of the slot being provided with aligned cross cuts providing seats, stringing cutter blades located in said seats, and a slicing cutter blade secured to said cylinder with its cutting edge extending over said slot and with its body portion in contact with said stringing cutter blades and constituting means for holding said stringing cutter blades in said seats.

3. The combination of a rotary cutter carrying drum provided with a slot extending longitudinally of the drum, the outer edges of the walls of the slot and the outer surface of the cylinder being provided with cross cuts providing seats, stringing cutter blades seated in said cross cuts and held against radial and circumferential movement of said seats, a slicing cutter blade in contact with said stringing cutter blades, and means for detachably securing said slicing cutter blade to said cylinder.

4. The combination of a rotary cylinder, slicing cutters mounted on said cylinder, a feeding trough, means for directing the slices into the interior of the cylinder, a fixedly mounted helical blade located within the cylinder and operating as the cylinder is rotated to deliver the slices out through one end of the cylinder, said blade comprising one coil of an axial length equal to that of a cylinder, and means for securing said blade in position with its inner end adjacent the other end of the cylinder.

5. The combination of a rotary cylinder, slicing cutters mounted on said cylinder, a feeding trough, means for directing the slices into the interior of the cylinder, a fixedly mounted helical blade located within the cylinder and operating as the cylinder is rotated to deliver the slices out through one end of the cylinder, said blade comprising one coil of an axial length equal to that of the cylinder, means for securing said blade in position with its inner end adjacent the other end of the cylinder, a stationary casing for said cylinder extending beyond one end of the cylinder, and a delivery opening in said extended portion adjacent the outer end of said blade.

EDWARD G. TRAINOR.
WARREN L. SCHAUB.